United States Patent [19]

Taniguchi et al.

[11] Patent Number: 5,330,117
[45] Date of Patent: Jul. 19, 1994

[54] CASSETTE ADAPTABLE TAPE WIDNING APPARATUS AND ASSEMBLY

[75] Inventors: Jun Taniguchi; Koichi Sota, both of Chohu, Japan

[73] Assignee: Otari, Inc., Chohu, Japan

[21] Appl. No.: 940,514

[22] Filed: Sep. 4, 1992

[30] Foreign Application Priority Data

Dec. 27, 1991 [JP] Japan .................. 3-346532

[51] Int. Cl.⁵ ........................... B65H 18/08
[52] U.S. Cl. ............................... 242/540
[58] Field of Search ............ 242/67.1 R, 56 R, 199

[56]  References Cited
U.S. PATENT DOCUMENTS 3,814,343  6/1974  Bennett et al. ............ 242/181 X
4,669,021  5/1987  Wakui et al. ............... 242/199 X Primary Examiner—Daniel P. Stodola
Assistant Examiner—John F. Rollins
Attorney, Agent, or Firm—David O'Reilly

[57] ABSTRACT

A tape cassette winding apparatus that can accept either an audio compact cassette (ACC) or a digital compact cassette (DCC) that has a revolving drive arrangement for rotating the hub or reel of the cassette to load tape into the cassette. The winding apparatus has first and second winding shafts constructed to fit into an ACC hub or DCC hub. A moving assembly selectively moves the correct winding shaft into position to engage either an ACC hub or DCC hub. The revolving drive rotates the cassette hub to load tape into the cassette when the correct winding shaft has been selected and engaged in the cassette hub. A lid opening assembly is provided to open and close the hub protective lid on DCC's.

11 Claims, 5 Drawing Sheets

CASSETTE ADAPTABLE TAPE WIDNING APPARATUS AND ASSEMBLY

FIELD OF THE INVENTION

The present invention relates to a winding apparatus for winding tape onto a hub or a reel of any of a plurality of types of cassettes, for example, an audio analog cassette or an audio digital cassette.

BACKGROUND OF THE INVENTION

Heretofore, in order to mass produce cassettes having magnetic tape wound therein, for example, audio analog compact cassettes (hereinafter referred to as the "ACC"), there has been a method that can directly wind the magnetic tape into the cassette having a leader tape applied in advance, and another method in which the magnetic tape and the leader tape are wound on the hub or reel before it is put into the cassette.

A tape winding apparatus for mass production of cassettes in the former method was disclosed in, for example, Japanese Patent Application Laid Open Sho 51-89404. In this method, the cassette is held in place, and the leader tape is drawn out of the cassette and cut in half. One end of the cut leader tape is stuck to one end of the supplied magnetic tape. In turn, a winding shaft is fitted in with the hub of the cassette. The winding shaft is rotate to wind the magnetic tape onto the hub. When a predetermined length of magnetic tape is wound, the winding shaft is stopped from rotating. The magnetic tape is cut. The cut end of the magnetic tape is stuck to the other cut end of the leader tape. The magnetic tape and leader tape stuck together left out of the cassette is wound into the cassette by the winding shaft before the completed cassette is discharged. The process described above is repeated to produce numbers of cassettes.

There has been proposed a digital compact cassette (hereinafter referred to as the "DCC") along with recent development of the digital electronics technology. It is made in a shape similar to the ACC. However, the hub of the DCC is made to have the winding shaft inserted only in a single side direction, while that of the ACC can have the winding shaft inserted in any of the both directions. Also, the winding shaft for the ACC is shaped at its end for ease of insertion into the hub, but cannot be put into the hub of the DCC. The reason is that while for the ACC the winding shaft can be put through the cassette body from its thin end to a thick fitting portion, but for the DCC it cannot be put through to reach the fitting position. Further, for the DCC, holes for insertion of the winding shaft are closed by a sliding lid to protect the magnetic tape wound in the DCC. To revolve the hub in the DCC, the lid provided on one side has to be opened before the winding shaft is fitted in the hub. Further more, the magnetic tape is to be wound on one of the hubs in the cassette, but the ACC and the DCC are different in hub size to wind magnetic tape. For these reasons, conventional winding apparatus used for production of an ACC could not wind tape a DCC irrespective of their similar shapes.

In view of the foregoing, one object of the present invention is to provide a winding apparatus capable of producing either an ACC or a DCC in a single unit.

Another object of the present invention is to provide an improved winding assembly for production of both an ACC or DCC using of the conventional ACC winding apparatus.

SUMMARY OF THE INVENTION

Briefly, the foregoing objects are accomplished in accordance with aspects of the present invention by a winding apparatus having a revolving arrangement 19 for revolving hub 4 or a reel in cassette ACC 1 or DCC 6 to wind a tape into the cassette. The revolving arrangement 19 comprises in combination a first winding shaft 21 fitting in hub 4 or the reel of a cassette, a second winding shaft 24 fitting in with a hub 4 or reel of a cassette in a direction opposite to that of the first winding shaft 21, revolution drive sources 22 and 25 for rotating the respective first and second winding shafts 21 and 24, and moving arrangements 23 and 26 for selecting either of first winding shaft 21 or second winding shaft 24 to move either first winding shaft 21, or second winding shaft 24, or cassettes ACC 1 and DCC 6 until it fits in hub 4 or reel of the cassette ACC 1 or DCC 6.

The winding apparatus described above should have a closing arrangement 34 for opening or closing a lid 8 of the cassette. The improving winding assembly should comprise in combination a revolving arrangement 33 for rotating the hub 4 or reel of cassette ACC 1 or DCC 6, and fixing arrangement 35 for fixing revolving arrangement 33. The improved winding assembly may comprise in combination the revolving arrangement 33 for revolving hub 4 or reel of cassette ACC 1 or DCC 6, opening and closing arrangement 34 for opening or closing lid 8 of cassette, and fixing arrangement 35 for fixing revolving arrangement 33 and opening and closing arrangement 34.

The revolving arrangement 33 of the improved winding assembly has winding shaft 36 formed so as to fit in hub 4 or the reel of cassette ACC 1, revolution drive source 37 for rotating the winding shaft 36, and first moving means 39 for moving winding shaft 36 so as to fit in hub 4 or the reel of cassette ACC 1.

The opening and closing means 34 of the improved winding assembly has pin 40 fitting in lid 8 of cassette DCC 6, and second moving arrangements 41 and 42 for fitting pin 40 in lid 8 of cassette DCC 6 to move lid 8 in an opening and closing direction.

The winding apparatus of the present invention operates as follows. First, if a cassette, such as ACC i in which the winding shaft can be fitted on either of its sides, for example, is to wind the tape, first winding shaft 21 of the cassette is moved to fit first winding shaft 21 in hub 4 or the reel of ACC 1. First revolution drive source 22 revolves first winding shaft 21 to wind magnetic tape 13. If a cassette DCC 6 in which the winding shaft can fit with only one side is to be wound with the magnetic tape 13, second winding shaft 24 or DCC 6 is moved to fit second winding shaft 24 in hub 4 or the reel of DCC 6. Second revolution drive source 25 rotates the second winding shaft 24 to wind magnetic tape 13.

If magnetic tape 13 is wound in DCC 6 having lid 8 provided thereon, opening and closing arrangement 20 makes lid 8 of DCC 6 open before first winding shaft 21 or second winding shaft 24 fits in to hub 4 of DCC 6.

In turn, the winding assembly operates as follows. First, fixing arrangement 35 is used to fix the winding assembly on the existing winding apparatus. To allow winding in DCC 6 of magnetic tape 13 that cannot be wound by an existing winding apparatus, revolution arrangement 33 of the winding assembly revolves hub 4 or the reel of DCC 6 to wind magnetic tape 13.

Further, to wind magnetic tape 13 in DCC 6 having lid 8, opening and closing arrangement 34 opens lid 8 of DCC 6 before the revolution arrangement 33 rotates hub 4 or reel of the DCC 6.

Reciprocal drive source 39 of revolution arrangement 33 moves winding shaft 36 to fit in to hub 4 or the reel of DCC 6, and revolution drive source 37 revolves winding shaft 36 to revolve hub 4 or the reel in DCC 6.

Further, second moving arrangements 40 and 41 of opening and closing arrangement 34 fit pin 40 in lid 8 of DCC 6 before moving pin 40 in the opening and closing direction of lid 8 of DCC 6 to shut lid 8.

DETAILED DESCRIPTION OF THE INVENTION

The following describes embodiments of the present invention with reference to the accompanying drawings.

Figure 1:
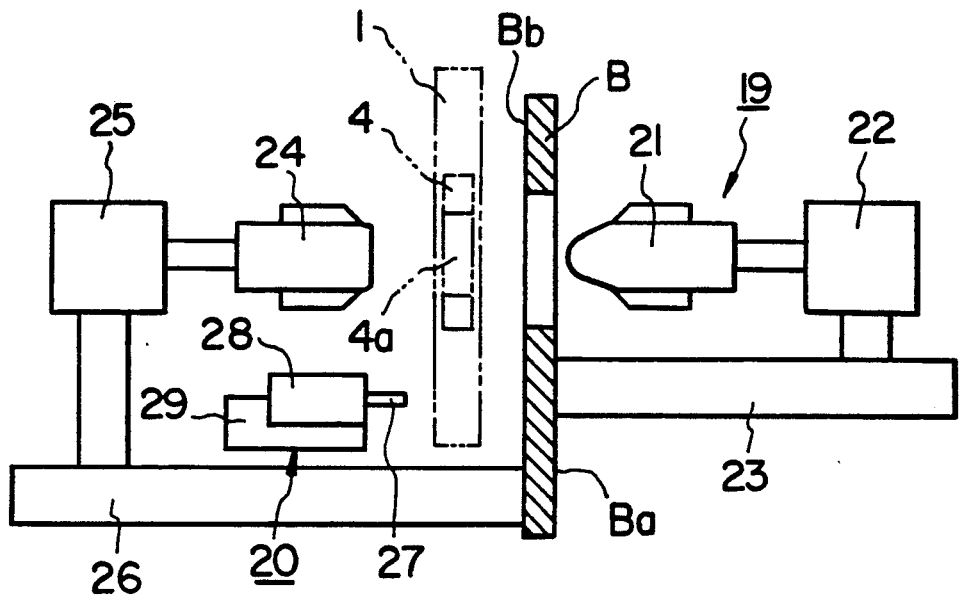
FIG. 1 is a plan view of a major arrangement of an embodiment of the present invention for the winding apparatus and winding assembly.
Figure 2:
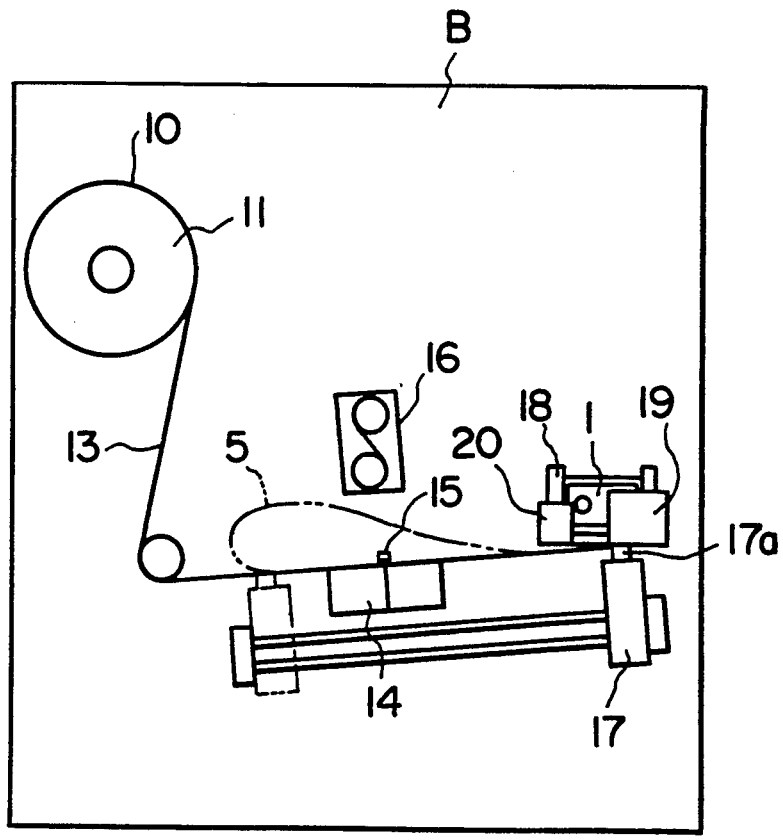
FIG. 2 is an overall view of the construction shown in FIG. 1.
Figure 3:
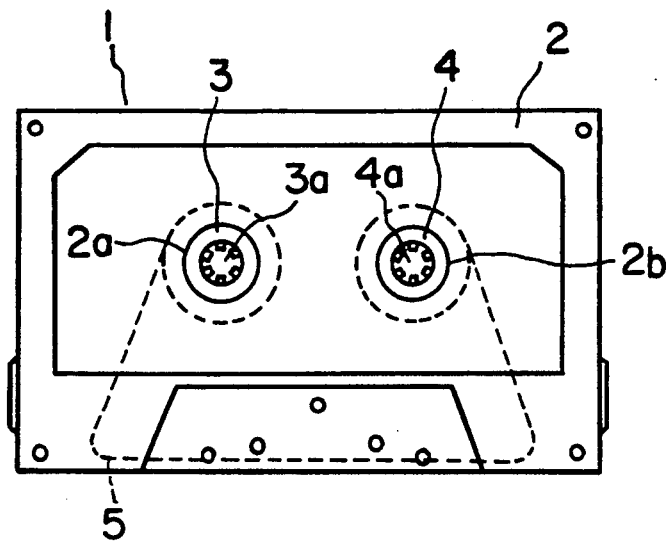
FIG. 3 is a front view of an analog compact cassette (ACC).

FIG. 1 is a plan view for a major arrangement of an embodiment of the present invention for a winding apparatus and winding assembly. FIG. 2 is an overall construction view of the apparatus of FIG. 1. FIG. 3 is a front view of an analog compact cassette (ACC).

Figure 4:
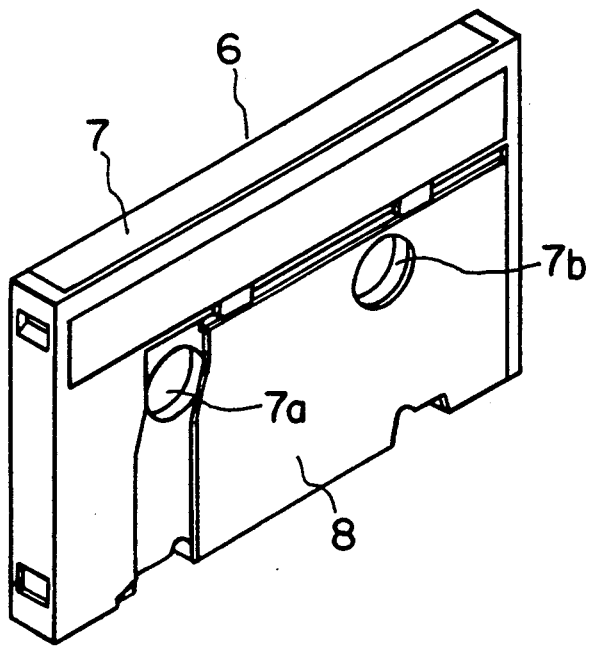
FIG. 4 is a perspective view of a digital compact cassette(DCC) with a lid moved rightward to expose hub holes.

FIG. 4 is a perspective view of an digital compact cassette(DCC) with lid 8 moved rightward to expose hub holes 7a and 7b.

This and the following paragraphs describe the shapes of the ACC and the DCC before explaining the winding apparatus of the present invention. ACC 1, as shown in FIG. 3, comprises case 2 and two hubs 3 and 4 put in case 2. Case 2 also has leader tape 5 therein the ends of which are connected with respective hubs 3 and 4. Case 2 has holes 2a and 2b on its front and rear sides so that winding shafts can fit in center holes 3a and 4a of hubs 3 and 4.

In turn, DCC 6, as shown in FIG. 4., comprises case 7, two hubs (not shown) in case 7 as in ACC 1, and lid 8 provided on its rear side. Case 7 also has leader tapes (not shown) therein the ends of which are connected with the respective hubs as in ACC 1. Case 7 further has holes 7a and 7b on the side on which lid 8 is provided. Lid 8 is made to slide on case 7. Lid 8 normally shuts holes 7a and 7b when forced leftward in FIG. 4 by a spring (not shown). Lid 8 can be moved rightward against the spring force to expose holes 7a and 7b. This allows the winding shafts to fit into the hubs.

The following describes the overall construction of the winding apparatus with reference to FIG. 2. The winding apparatus is arranged on base plate B as follows. A supply arrangement 10 supplies long magnetic tape 13 wound on reel 11. Attracting arrangement 14 attracts and holds magnetic tape 13 and leader tape 5. Movable path 14a can select the fitting position of magnetic tape 13 and leader tape 5 as shown in FIG. 7 or 8.

Figure 7:
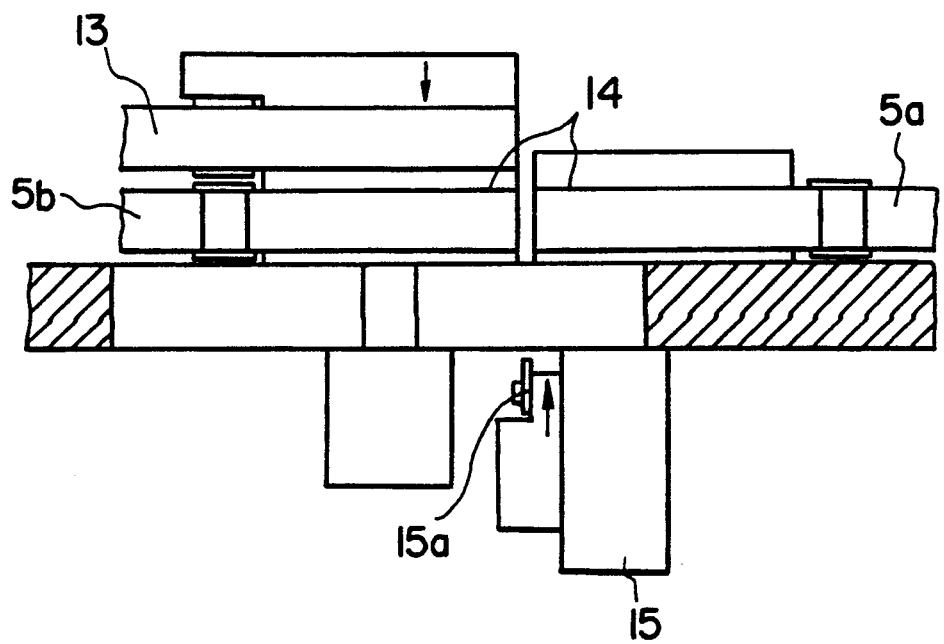
FIG. 7 is a plan view illustrating the tape paths of the attracting arrangement in connection of the magnetic tape and the leader tape.

Cutting arrangement 15 has cutting blade 15a to cut magnetic tape 13 and leader tape 5 held on attracting arrangement 14 as shown in FIG. 7. The cut ends of leader tape 5 are denoted by 5a and 5b in FIGS. 7 and 8.

Figure 8:
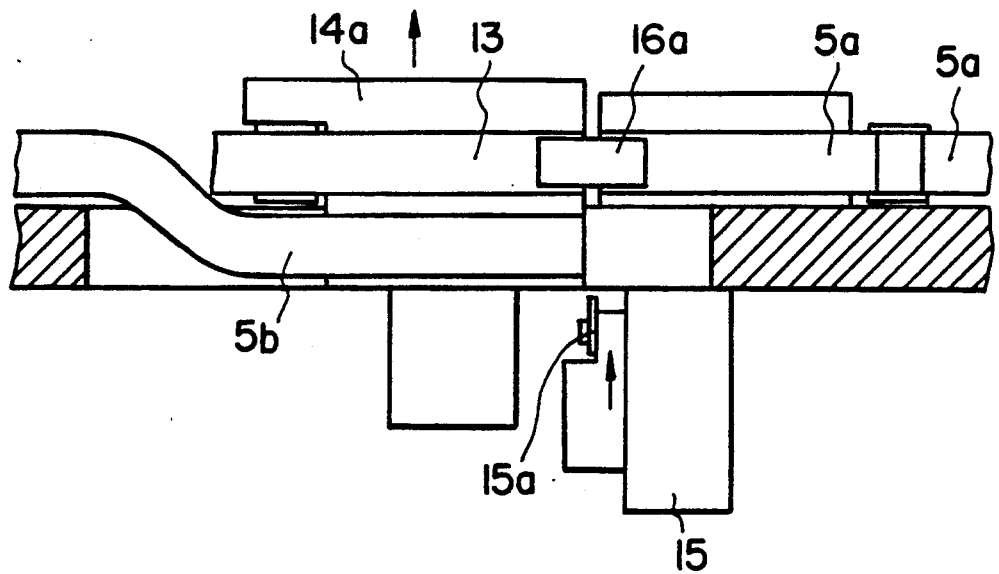
FIG. 8 is a plan view illustrating the state in which the tape paths are changed from the paths shown in FIG. 7.

Sticking arrangement 16, as shown in FIG. 8, can stick the beginning of magnetic tape 13 held and fitted on attracting arrangement 14 to cut end 5a of leader tape 5 using an adhesive tape 16a. Similarly, the other cut end 5b of leader tape 5 is stuck to an end of magnetic tape 13 positioned at cut end 5a in the position shown in FIG. 7 using an adhesive tape 16a. The arrangement described previously in this paragraph will not be described further as it is not related to the essence of the present invention.

Drawing arrangement 17 for leader tape 5 has attracting head 17a that can attract leader tape 5 to draw it out of ACC 1 or DCC 6 held by cassette holding arrangement 18 to place it on attracting arrangement 14.

Revolving arrangement 19 is an arrangement (which will be described later) that can rotate the hub 4 of ACC 1 or DCC 6 held on cassette holding arrangement 18. Opening and closing arrangement 20 is an arrangement (which will be described later) that can open or close lid 8 of DCC 6.

In turn, the following describes revolving arrangement 19 and opening and closing arrangement 20 by reference to FIG. 1. It should be noted that ACC 1 is held on the cassette retaining arrangement (not shown). Also, note that DCC 6 can alternatively be held at the same position as ACC 1. First winding shaft 21 is formed so that it can fit in to hole 4a of hub 4 in ACC 1, and is rotatably held by first revolution drive source 22. First revolution drive source 22 is secured to first reciprocal drive source 23 fixed on side Ba of base plate B, and can reciprocally move in a direction perpendicular to B. This reciprocal motion allows first winding shaft 21 to be a positioned to fit in hole 4a of hub 4 in ACC 1 and then to another position to be released from hole 4a.

Second winding shaft 24 is formed so that it can fit in hole 4a of hub 4 in DCC 6, and is rotatably held by second revolution drive source 25. Second revolution drive source 25 is held to second reciprocal drive source 26 fixed on the rear side Bb of base plate B, and can reciprocally move in a direction perpendicular to base plate B. This reciprocal motion allows second winding shaft 24 to be positioned to fit into hole 4a of hub 4 in DCC 6 and then to another position at which it can be released from hole 4a. That is, the moving arrangement for selecting and fitting either first winding shaft 21 or the second winding shaft 24 in the hub, comprises first reciprocal drive source 23 and second reciprocal drive source 26 here.

In turn, the following describes the opening and closing arrangement 20 for the lid 8. Pin 27 is formed to fit in lid 8 of DCC 6, and is held on third reciprocal drive source 28 to reciprocally move in a direction perpendicular to DCC 6. The reciprocal motion allows pin 27 to be positioned to fit in lid 8 of DCC 6 and to another position at which it can be released. Third reciprocal drive source 28 is fixed on fourth reciprocal drive source 29, and is reciprocally moved parallel to DCC 6. This reciprocal motion allows pin 27 to open or close lid 8 of DCC 6.

In the construction described above, the winding apparatus operates as follows. First, winding magnetic tape 13 into ACC 1 is described below. An end of magnetic tape 13 supplied from supply arrangement 10 is attracted and held by the attracting arrangement 14. Drawing arrangement 17 draws leader tape 5 out of ACC 1 to retain and hold it on attracting arrangement 14 as shown in FIG. 7. Cutting arrangement 15 cuts leader tape 5 held on attracting arrangement 14. In turn, movable path 14a of the attracting arrangement 14 is switched as shown in FIG. 8 to fit one cut end 5a of leader tape 5 with the beginning of magnetic tape 13. Sticking arrangement 16 sticks these tapes together with adhesive tape 16a, After this, attracting arrangement 14 releases stuck magnetic tape 13 and leader tape 5. Then, first winding shaft 21 moves to fit in hole 4a of hub 4 in ACC 1, and rotates. After a predetermined quantity of magnetic tape 13 is wound, first winding shaft 21 stops rotating. In turn, attracting arrangement 14 attracts magnetic tape 13 again and cutting arrangement 15 cuts magnetic tape 13. In turn, movable path 14a of attracting arrangement 14 is switched as shown in FIG. 7 to fit the cut end magnetic tape 13 on the side of ACC 1 with the other cut end 5b of leader tape 5. Sticking arrangement 16 sticks these tapes with an adhesive tape 16a in the same way as above. First winding shaft 21 rotates again toward stuck magnetic tape 13 and leader tape 5 to complete ACC 1.

The following describes winding magnetic tape 13 in DCC 6. As this is the same as for ACC 1 except for the operation of the winding shaft being fitted in the hub to rotate, it is described briefly. First, third reciprocal drive source 28 shogun in FIG. 1 moves pin 27 rightward in FIG. 1 to fit in lid 8 of the DCC 6 held at the same position ACC i is held. Fourth reciprocal drive source 29 moves pin 27 rightward in FIG. 1 to make lid 8 open as shown in FIG. 4. In turn, leader tape 5 is drawn out of DCC 6 to be cut and stuck to the beginning end of magnetic tape 13 in the same way as above. After this, second winding shaft 24 moves to fit in hub i of DCC 6, and rotates. After a predetermined quantity of magnetic tape 13 is wound, second winding shaft 24 stops rotating. Magnetic tape 13 is then cut and the cut end of magnetic tape 13 is stuck to the other end of leader tape 5. Second winding shaft 24 winds magnetic tape 13 and leader tape 5 left outside the DCC 6 into the DCC 6. Second winding shaft 24 detaches from hub 4 of the DCC 6 and closing arrangement 20 closes lid 8.

Figure 5:
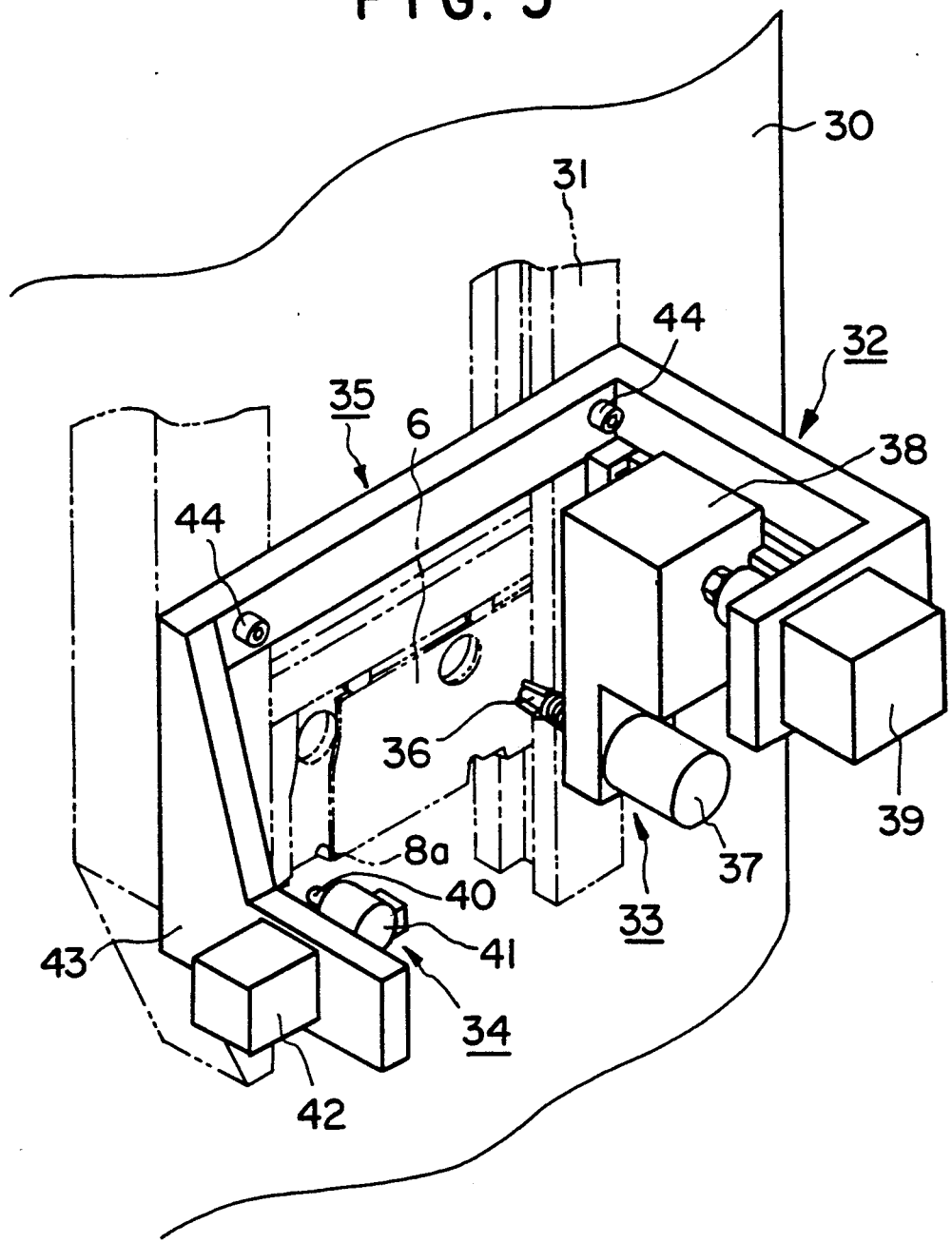
FIG. 5 is a perspective view of the winding assembly.

In turn, the following describes the winding assembly that is installed on a conventional winding apparatus for the ACC only to make this serve both for the ACC and the DCC, by reference to FIG. 5.

This figure is a perspective view of a winding assembly. Winding apparatus body 30 has cassette holding arrangement 31 for holding ACC 1 or DCC 6 and the ACC winding shaft (not shown) installed thereon, winding assembly 32 is installed on winding apparatus body 30 to make possible winding of magnetic tape 13 to DCC 6. Winding assembly 32 comprises revolution arrangement 33 for rotating hub 4 in DCC 6, opening and closing arrangement 34 for opening or closing lid 8 of DCC 6, fixing arrangement 35 for fixing revolution arrangement 33 and opening and closing arrangement 34 on cassette holding arrangement 31. Revolution arrangement 33 comprises winding shaft 36 formed like second winding shaft 24, a motor for supporting and revolving winding shaft 36, moving block 38 for fixing revolution drive source 37, and reciprocal drive source 39 which is a moving arrangement for reciprocally moving block 38. Reciprocal drive source 39 reciprocally moves winding shaft 36 in a direction perpendicular to DCC 6 being held by cassette holding arrangement 31, Opening and shutting arrangement 34 has pin 40 which fits in lid 8 of DCC 6, reciprocal drive source 41 for holding and reciprocally moving pin 40 perpendicular to DCC 6, and reciprocal drive source 42 for reciprocally moving reciprocal drive source 41 parallel to DCC 6. Reciprocal drive source 41 and reciprocal drive source 42 form a second moving arrangement. Fixing arrangement 35 comprises fixed block 43 for fixing reciprocal drive 'source 39 and the reciprocal drive source 42, screws 44 for fixing fixed block 43 on the cassette holding arrangement 31.

Winding assembly 32, constructed as above, operates as follows. Reciprocal drive source 41 fits pin 40 with an end 8a of lid 8. Reciprocal drive source 42 runs to move the pin 40 to open the right lid 8 to the right in FIG. 5. With lid 8 opened, reciprocal drive source 39 runs to fit winding shaft 36 in a hub (not shown) of DCC 6. After this, revolution drive source 37 rotates the winding shaft 36 to wind magnetic tape 13.

It will be understood that the present invention is not limited to the specific embodiments hereinbefore discussed but extends to all modifications thereof which will occur to those skilled in the art upon consideration of the general disclosure.

Figure 6:
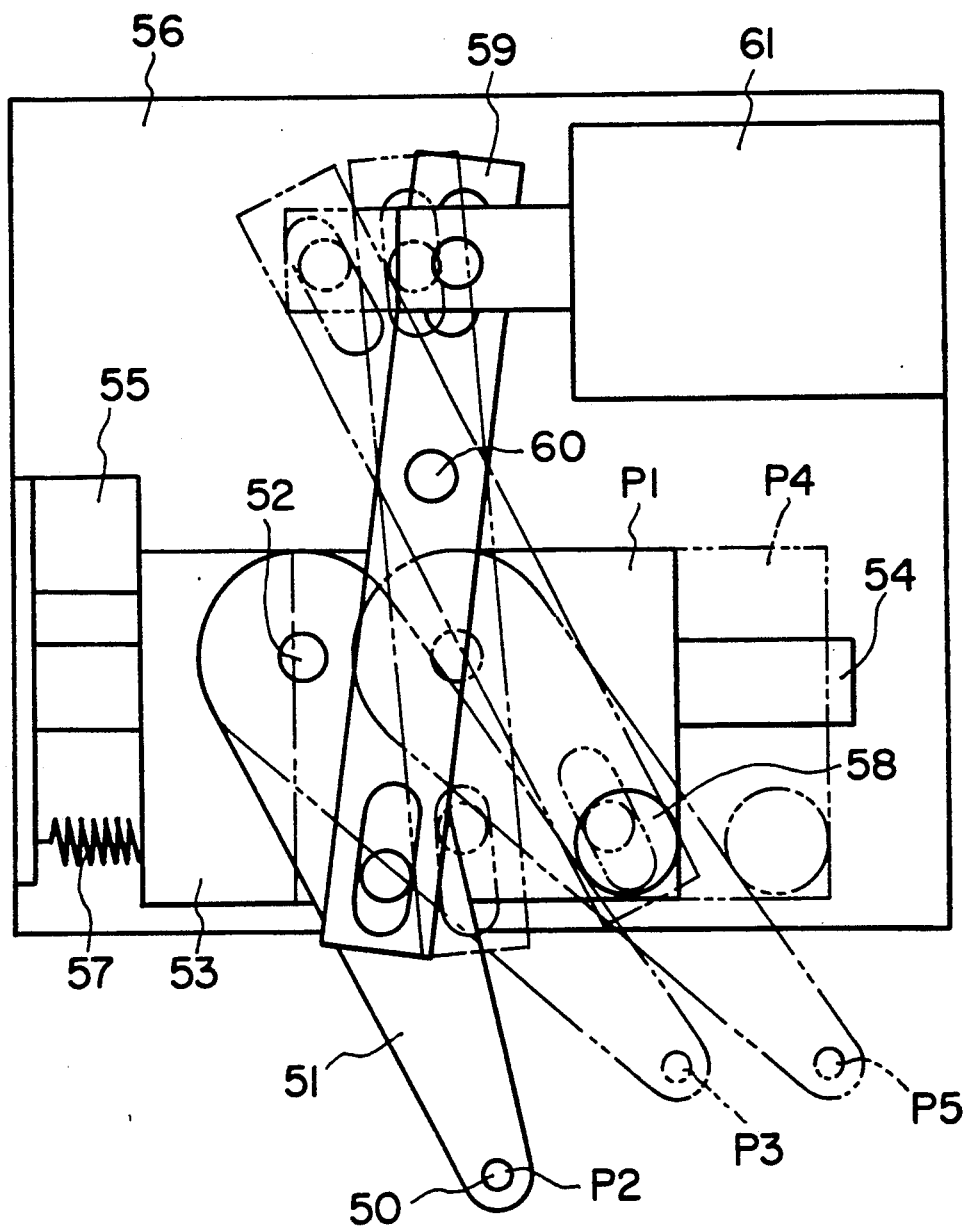
FIG. 6 illustrates another embodiment of a cassette opening and closing arrangement.

As an example, the opening and shutting arrangement for the lid 8 of the DCC 6 may be made up as shown in FIG. 6. This figure illustrates another embodiment of the opening and closing arrangement. Pin 50, which is shaped like a pillar is fixed at right angles on an arm 51. Arm 51 is turnably held on moving plate 53 with the center at fulcrum 52. Moving plate 53 can move on a rail 54 to the right and left in the figure. Its leftward motion is limited by stopper 55. Rail 54 and stopper 55 are fixed on base plate 56. Moving plate 53 is forced toward stopper 55 by spring 57 one end of which is fixed on base plate 56. Moving plate 53 has pillarlike stopper 58 fixed thereon to the right in reference to arm 51. Link plate 59 is turnably held on fulcrum 60 fixed on base plate 56. One end of link plate 59 is coupled with reciprocal drive source 61 fixed on base plate 56, and the other end is coupled with arm 51 via a long hole and a pin.

The opening and closing arrangement in FIG. 6, constructed as above, operates as follows. First, if reciprocal drive source 61 is not run, moving plate 53 is forced to left position P1 by spring 57, and pin 50 is at position P2. Pin 50 at the position is not fitted in lid 8 of DCC 6 yet. In turn, reciprocal drive source 61 runs to cause link plate 59 to move arm 51 to a left dot-dash-line position in the figure, thus moving pin 50 to position P3. At this position P3, pin 50 fits in lid 8 of DCC 6. If reciprocal drive source 61 moves link plate 59 further, arm 51 touches stopper 58 and moves moving plate 53 to position P4. With the moving plate 53 moved, pin 50 moved to right position P5 in the figure to open lid 8 of DCC 6. For closing lid 8, reciprocal drive source 61 returns to its home position, and the force of spring 57 returns moving plate 53 to position P1 and pin 50 to position P2.

While a few embodiments of the present invention have been illustrated and described in detail, it should be particularly understood that the invention is not limited thereto or thereby. It is to be understood that the form of the present invention herewith shown and described is to be taken as a preferred embodiment. Various changes may be made in the shape, size and arrangement of parts. For example, equivalent elements may be substituted for those illustrated and described herein, parts may be reversed, and certain features of the present invention may be utilized independently of the use of other features, all without departing from the spirit or scope of the present invention as defined in the subjoined claims.

The winding apparatus of the present invention can wind magnetic tape in types of cassette having different a winding shaft fitting direction or different fitting hub shape with the same single unit, as the winding shafts face each other. The winding assembly of the present invention having the revolving arrangement and the fixing arrangement, can be installed on a conventional winding apparatus so that the winding shaft fits in the cassette only in one direction. This allows the magnetic tape to be wound in the cassette having a different winding shaft fitting direction or different hub shape. Further, the opening and closing arrangement will not allow winding of the cassette unless the lid is opened.

What is claimed is:

1. An adaptable cassette tape winding apparatus for loading tape into a cassette comprising: cassette holding means for positioning and holding a cassette; first rotating drive means having a first rotatable drive shaft for fitting the hub of one type of tape cassette; second rotating drive means having a second rotatable drive shaft for fitting the hub of another type of tape cassette; said first and second drive shafts being on opposite sides of said cassette holding means; reciprocal moving means for selectively moving said first or second rotatable drive shaft into engagement with a cassette mounted in said cassette holding means whereby said cassette tape winding apparatus is adaptable to load tape into different type tape cassettes.

2. The apparatus according to claim 1 in which said reciprocal moving means comprises first and second reciprocal moving means; said first and second rotating drive means being mounted on said first and second reciprocal moving means respectively.

3. The apparatus according to claim 2 including lid opening means for opening a protective lid covering holes in a cassette hub.

4. The apparatus according to claim 3 in which said lid opening means comprises a pin for engaging said lid; and reciprocal means for moving said pin into engagement with said lid and moving said lid away from said hub holes; whereby one of said drive shafts can engage a cassette hub.

5. The apparatus according to claim 1 including lid opening means for opening a protective lid covering holes in a cassette hub.

6. The apparatus according to claim 5 in which said lid opening means comprises a pin for engaging said lid; and reciprocal means for moving said pin into engagement with said lid and moving said lid away from said hub holes; whereby one of said drive shafts can engage a cassette hub.

7. In a conventional tape winding apparatus having a cassette holding means for positioning and holding a cassette, and first drive means for winding tape into a first type of tape cassette and having a first rotatable drive shaft for fitting a hub of said first type of tape cassette the improvement comprising: a winding assembly comprising; a second drive means for winding tape into a second type of tape cassette having a hub; and fixing means for fixing said winding assembly on a base of said conventional winding apparatus, said second drive means being on an opposite side of said cassette holding means from said first drive means; reciprocal moving means for selectively moving said first rotatable drive shaft and said second drive means into engagement with the hub of a cassette of said first and said second type respectively, mounted in said cassette holding means whereby said conventional cassette tape winding apparatus is adapted to load magnetic tape into different type cassettes.

8. The winding apparatus according to claim 7 in which said second drive means includes a second rotatable shaft for fitting the hub of a second type of cassette; and a revolving drive source for rotating said second rotatable drive shaft.

9. The winding apparatus according to claim 7 in which said winding assembly includes opening and closing means for opening and closing a lid on said second type of cassette.

10. The winding apparatus according to claim 9 in which said lid opening and closing means includes a pin for engaging said lid on said second type of cassette; second reciprocal moving means for reciprocally moving said pin into engagement with said lid and to move said lid to an open or closed position.

11. The winding apparatus according to claim 10 in which said second drive means includes a second rotatable shaft for fitting the hub of a second type of cassette; a revolving drive source for rotating said second rotatable drive shaft.

* * * * *